United States Patent
Stahl

(10) Patent No.: US 10,347,245 B2
(45) Date of Patent: Jul. 9, 2019

(54) NATURAL LANGUAGE GRAMMAR ENABLEMENT BY SPEECH CHARACTERIZATION

(71) Applicant: SoundHound, Inc., Santa Clara, CA (US)

(72) Inventor: Karl Stahl, Menlo Park, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 0 days.

(21) Appl. No.: 15/411,567

(22) Filed: Jan. 20, 2017

(65) Prior Publication Data

US 2018/0182385 A1 Jun. 28, 2018

Related U.S. Application Data

(60) Provisional application No. 62/438,920, filed on Dec. 23, 2016.

(51) Int. Cl.
| | | |
|---|---|---|
| *G10L 15/19* | (2013.01) | |
| *G10L 15/197* | (2013.01) | |
| *G10L 15/18* | (2013.01) | |
| *G10L 25/63* | (2013.01) | |
| *G10L 17/02* | (2013.01) | |
| *G10L 15/02* | (2006.01) | |

(52) U.S. Cl.
CPC .......... *G10L 15/19* (2013.01); *G10L 15/1822* (2013.01); *G10L 17/02* (2013.01); *G10L 25/63* (2013.01); *G10L 15/1807* (2013.01); *G10L 2015/025* (2013.01)

(58) Field of Classification Search
CPC ... G10L 15/1822; G10L 15/19; G10L 17/005; G10L 17/14; G10L 2015/223; G10L 2015/226; G10L 2015/227; G10L 2015/228; G10L 15/1807; G10L 15/193; G10L 15/197
USPC .......... 704/250, 255, 275, 236, 257
See application file for complete search history.

(56) References Cited

U.S. PATENT DOCUMENTS

| | | | | |
|---|---|---|---|---|
| 5,953,701 A | * | 9/1999 | Neti ...................... | G10L 15/142 704/240 |
| 6,985,862 B2 | * | 1/2006 | Strom ................... | G10L 15/197 704/255 |
| 7,302,392 B1 | * | 11/2007 | Thenthiruperai ....... | G10L 15/19 704/251 |

(Continued)

OTHER PUBLICATIONS

Sensory Introduces Speaker Identification for Consumer Electronic Devices, press release, May 2, 2012, Sensory, Inc.

(Continued)

*Primary Examiner* — Martin Lerner
(74) *Attorney, Agent, or Firm* — David R. Stevens; Stevens Law Group

(57) ABSTRACT

Either or both of voice speaker identification or utterance classification such as by age, gender, accent, mood, and prosody characterize speech utterances in a system that performs automatic speech recognition (ASR) and natural language processing (NLP). The characterization conditions NLP, either through application to interpretation hypotheses or to specific grammar rules. The characterization also conditions language models of ASR. Conditioning may comprise enablement and may comprise reweighting of hypotheses.

4 Claims, 10 Drawing Sheets

(56) References Cited

U.S. PATENT DOCUMENTS

| | | | |
|---|---|---|---|
| 7,840,409 B2 * | 11/2010 | Ativanichayaphong | G10L 15/1815 704/270.1 |
| 8,145,484 B2 * | 3/2012 | Zweig | G10L 15/22 704/231 |
| 8,195,460 B2 * | 6/2012 | Degani | G10L 15/06 704/243 |
| 8,676,574 B2 * | 3/2014 | Kalinli | G10L 15/1807 704/243 |
| 8,682,661 B1 * | 3/2014 | Schalkwyk | G10L 15/1815 704/257 |
| 9,129,599 B2 * | 9/2015 | Dhanakshirur | G10L 15/065 |
| 9,741,340 B2 * | 8/2017 | Czahor | G10L 15/19 |
| 2002/0169604 A1 * | 11/2002 | Damiba | G10L 15/183 704/231 |
| 2003/0004717 A1 * | 1/2003 | Strom | G10L 15/197 704/240 |
| 2004/0006474 A1 | 1/2004 | Gong et al. | |
| 2005/0080632 A1 * | 4/2005 | Endo | G10L 15/08 704/277 |
| 2005/0137868 A1 * | 6/2005 | Epstein | G10L 15/183 704/252 |
| 2005/0152511 A1 * | 7/2005 | Stubley | H04M 3/42204 379/88.01 |
| 2005/0261901 A1 * | 11/2005 | Davis | G10L 15/19 704/235 |
| 2005/0288935 A1 * | 12/2005 | Lee | G10L 15/26 704/270 |
| 2007/0143825 A1 * | 6/2007 | Goffin | H04L 63/08 726/2 |
| 2007/0208555 A1 * | 9/2007 | Blass | 704/9 |
| 2009/0106028 A1 * | 4/2009 | Dhanakshirur | G10L 15/065 704/270.1 |
| 2009/0157404 A1 * | 6/2009 | Brown | G10L 15/19 704/257 |
| 2009/0292530 A1 * | 11/2009 | Jarmulak | G10L 15/1815 704/243 |
| 2010/0106503 A1 | 4/2010 | Farrell et al. | |
| 2011/0202341 A1 * | 8/2011 | Brown | G10L 15/19 704/239 |
| 2011/0208524 A1 | 8/2011 | Haughay | |
| 2011/0276327 A1 * | 11/2011 | Foxenland | G10L 15/26 704/235 |
| 2012/0245941 A1 | 9/2012 | Cheyer | |
| 2013/0006634 A1 | 1/2013 | Grokop et al. | |
| 2015/0120297 A1 * | 4/2015 | Meruva | G10L 15/063 704/243 |
| 2016/0093304 A1 | 3/2016 | Kim et al. | |
| 2016/0210968 A1 * | 7/2016 | Ouakil | G10L 15/183 |
| 2016/0372110 A1 * | 12/2016 | Waltermann | G10L 15/22 |
| 2016/0379638 A1 * | 12/2016 | Basye | G10L 15/22 704/235 |
| 2017/0068513 A1 * | 3/2017 | Stasior | G10L 15/32 |
| 2017/0098450 A1 * | 4/2017 | Chambers | G10L 15/30 |
| 2017/0169816 A1 * | 6/2017 | Blandin | G10L 15/26 |
| 2017/0358317 A1 * | 12/2017 | James | G10L 15/26 |

OTHER PUBLICATIONS

Authenticating Customers with Nuance Voice Biometrics Solutions, IBM Redbooks, Sep. 10, 2012, IBM, Inc.

Shivaji J. Chaudhari, et al., Automatic Speaker Age Estimation and Gender Dependent Emotion Recognition, International Journal of Computer Applications, May 2015, vol. 117—No. 17, IJCA.

Michael Feld, et al., Automatic Speaker Age and Gender Recognition in the Car for Tailoring Dialog and Mobile Services, Interspeech 2010, Sep. 26-30, 2010, pp. 2834-2837, ISCA, Makuhari, Chiba, Japan.

Anja Bethmann, et al., On the definition and interpretation of voice selective activiation in the temporal cortex, Frontiers in Human Neuroscience, Jul. 8, 2014, vol. 8, Article 499, www.frontiersin.org.

* cited by examiner

NATURAL LANGUAGE GRAMMAR ENABLEMENT BY SPEECH CHARACTERIZATION

CROSS REFERENCE TO RELATED APPLICATIONS

This application claims the benefit of U.S. Provisional Application Ser. No. 62/438,920, entitled "Natural Language Grammar Enablement By Speech Characterization," filed Dec. 23, 2016, the disclosure of which is incorporated herein by reference in its entirety.

FIELD OF THE INVENTION

The present invention is in the field of voice-controlled machines, and particularly improved interpreters of natural language grammar rules.

BACKGROUND

Some voice-controlled machines use speaker identification as a way, or part of a way, to enable a user to access information or control a system. This can be done by comparing a user's speech audio to a previously collected "voiceprint" consisting of characteristics of a user's voice that allow the system to uniquely determine the user's identity (UID).

Some voice-controlled machines use utterance classification as a way, or part of a way, to control system behavior. This is done by analyzing speech audio and classifying the utterance. Some typical categories of utterance classifications are the speaker gender; the speaker age group; the speaker accent, ethnicity, or nationality; the prosody of the utterance (such as speed, emphasis, and other vocal variations); the speaker mood; and the speaker health.

Some voice-controlled machines perform natural language processing using a grammar, which comprises rules. Some grammars group rules into domains of knowledge. A semantic parser takes as input one or more transcriptions likely to represent the words in the speech audio; processes the transcriptions using the grammar rules; and outputs one or more interpretations likely to represent the meaning of the system user's speech. Interpretations are computer data structures that represent the meaning of sentences. They represent sentence constituents and their relationships. Action modules take interpretations as input and perform appropriate actions. For example, some modules access data through web application programming interface (API) hits. Some modules actuate motors to control the movements of mechanical devices. Some modules perform communication operations, such as sending text messages. Some modules store information. Innumerable other functions are possible with appropriate action modules.

The system and methods disclosed herein provide an improved approach for generating interpretations of speech inputs.

SUMMARY OF THE INVENTION

The present disclosure is directed to systems, methods, and algorithms that use speech characterization to condition automatic speech recognition and parsing according to natural language grammars. Characterization includes any of voice speaker identification, speaker classification, and utterance classification. Embodiments of systems described herein apply characterization to speech recognition, natural language processing, or both.

The present invention provides a human-machine interface that feels much more natural to users. Humans, in naturally interpreting spoken utterances, let clues about the attributes (age, gender, ethnicity, mood, prosody) of a speaker influence their interpretations. Furthermore, for specifically known speakers, humans apply all of their knowledge of the speaker in their interpretations. These human skills in interpretation work even without visual clues. Over telephone calls and teleconference humans interpret what they hear according to how they classify the voice of unknown speakers or identify particular known speakers by voice. The present invention provides for natural, conversational, human-machine interfaces in ways that conventional applications of voice classification and voice speaker identification do not.

Some embodiments use the valuable information identifiable from speaker and utterance characteristics to provide more appropriate and more useful behaviors and results. Characterization according to some embodiments comprises classification of the speaker by one or more of age, gender, accent, prosody, and mood among other identifiable characteristics of speech utterances. Characterization according to some embodiments comprises voice speaker identification to identify a user profile, including a set of permissions and a set of other properties that describe the user.

Various embodiments perform automatic speech recognition (ASR) using the characterization to condition the usage of a statistical language model (SLM) or the set of resulting transcription hypotheses. Various embodiments perform natural language processing (NLP) using the characterization to condition the grammar rules or resulting interpretations. For some embodiments, conditioning includes absolute Boolean enablement or disablement of SLM terms or grammar rules. For some embodiments, conditioning includes defining weights that affect the computation of hypothesis likelihood scores.

DETAILED DESCRIPTION

Characterization

Figure 1:
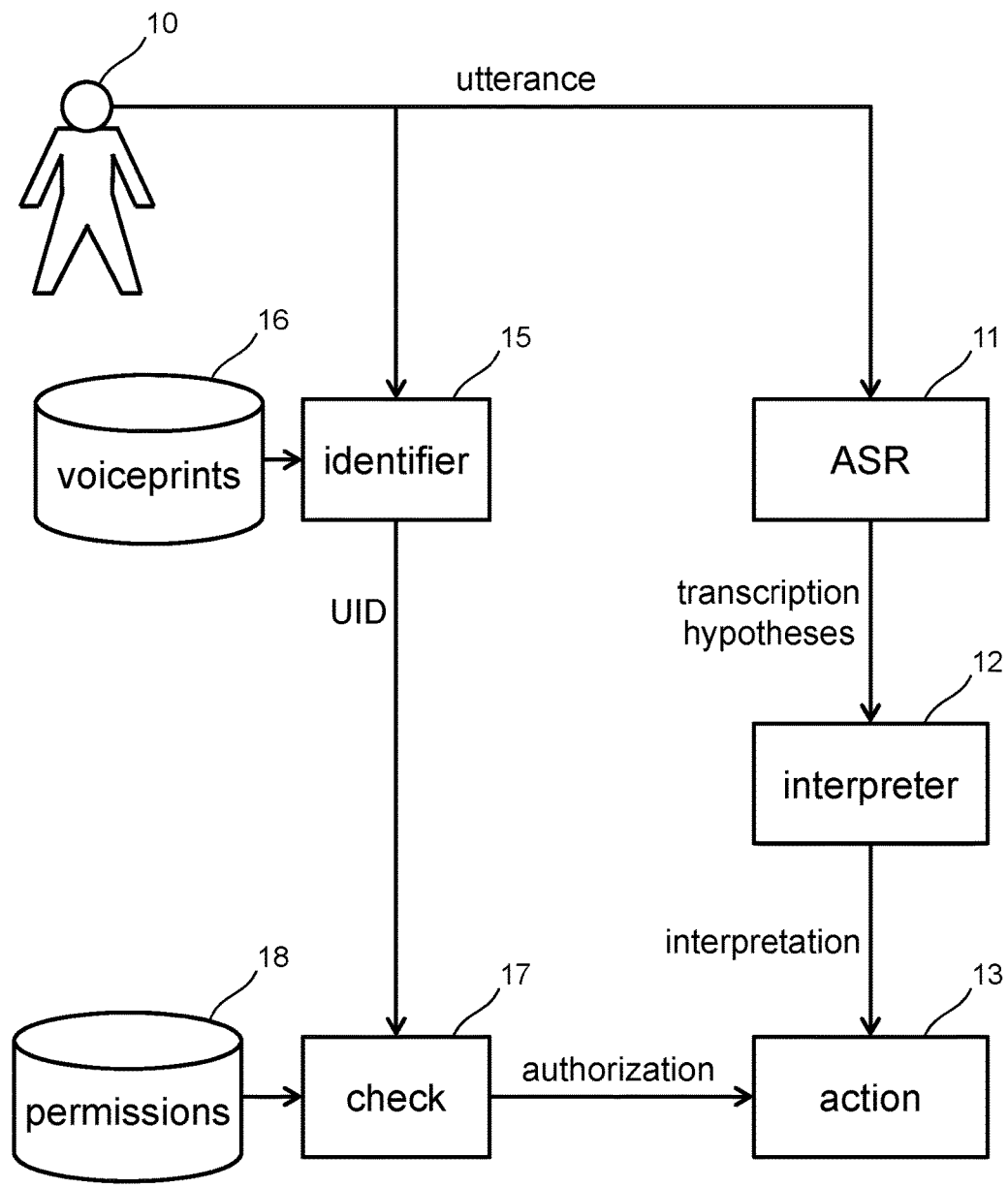
FIG. 1 illustrates operation of a speech-enabled device with voice speaker identification authorization control.

Various conventional voice controlled machines' action modules act on interpretations in different useful ways, as affected by UID or utterance classification inputs. However, the speech recognition transcriptions and natural language interpretations are ignorant of those useful inputs. The interpreted meaning of the user speech does not consider a particular user or the user's profile. The interpreted meaning of the user speech does not account for user age, gender, accent, prosody, or mood. Valuable information is ignored in such systems.

Some embodiments of the invention capture audio that contains speech utterances using microphones or other mechanisms for converting voice-generated sound waves into electronic signals. Mobile phones, automobiles, retail fulfillment systems, and personal cognitive enhancement devices are some types of such embodiments. Some embodiments receive signals, such as bit streams captured on other devices, representing audio that contains speech utterances. Servers, desktop computers, and mobile phones are some types of such embodiments.

Speech utterances are expressions vocalized by people. For some embodiments, such people are active, intentional users of a system. Some such embodiments are conversational virtual assistants, personal robots, and automobiles. For some embodiments, people are passive sources of useful information. Some such embodiments are consumer research monitors, advertisement displays, and public safety and pre-emptive criminal evidence collection devices.

Every speech utterance has certain characteristics, some of which are sometimes identifiable from the audio capture of the speech utterance. For example, voice classifier subsystems can often classify an utterance as to whether it is from a young child or not, whether is from a female or male speaker, what is the regional accent of the speaker, what is the speaker's mood, whether the utterance is a question, whether the utterance is a command, and what parts of the utterance are most important. Some embodiments use the class information from such a voice classifier. For example, home entertainment systems provide different default sets of TV show choices for children than for adults, and allow adults but not children to order paid content. Voice controlled automobiles disable functions, such as a capability to open windows while driving at high speed, for command utterances classified as being from a child. Shopping facilitation devices display different clothing options in response to general requests from women's voices and men's voices. Travel advisors provide different restaurant choices in response to general requests made with different regional accents. Virtual assistants provide short responses to requests classified as hurried. Various types of utterance classification subsystem known in the art are appropriate for various embodiments.

Some embodiments perform speaker identification. Various types of speaker identification subsystems known in the art are appropriate for various embodiments. Many such speaker identification subsystems work by comparing parts of utterances to voiceprints stored in a database with UIDs. Some systems use speaker voice identification to determine UIDs, or confirm UIDs asserted from other inputs; retrieve sets of permissions associated with UIDs in a stored database; and check them in order to enable authorization for an action. Some such systems are financial services call centers that allow customers to perform financial transactions by voice over a telephone connection, computing environments with secured access to sensitive data, access-controlled buildings with secured doors, and voice controlled home automation systems for adjusting thermostats and operating garage doors.

FIG. 1 illustrates processing a user utterance to request a conditional action. User 10 makes an utterance that a microphone captures and the system digitizes. ASR module 11 consumes the utterance and produces one or more transcription hypotheses.

Some embodiments do so by (1) comparing acoustic features to phonemes in an acoustic model trained on numerous labeled speech utterances, the acoustic model trained to output one or more hypothesized probability-scored possible phoneme sequences in response to the acoustic features; (2) comparing the hypothesized phoneme sequences to words in a phonetic dictionary that, in a particular order would produce the phoneme sequence; and (3) weighting the probability scores of each phoneme sequence by the frequency with which the matching words occur together and in the hypothesized order in a statistical language model built from a corpus of language samples, to produce the likelihood-scored transcription hypotheses.

Various embodiments represent transcription hypotheses as one or more of strings of text, strings of phonemes, and other compact tokenized representations of the utterance. Interpreter 12 consumes the transcription hypotheses and produces an interpretation. Interpretations are data structures that represent the hypothesized intent of the speaker when making the utterance. The interpretation of an utterance represent pieces of semantic information contained the utterances and relationship between the pieces of information. For example, an interpretation of the utterance, "What's the weather tomorrow?" encodes that the utterance is a request for information, the type of information is weather, and tomorrow indicates what weather. For example, an interpretation of the utterance, "Call Mom." encodes that the utterance is a command, the command is to make a call, and the target of the call is an entity, Mom. Various known ways of representing interpretations are appropriate. Action module 13 consumes the interpretation, and might, or might not, perform a requested action. The actions that action module 13 can perform varies greatly between various embodiments. Some virtual assistants are able to look up and report weather forecasts to users. Some virtual assistants are able to place phone calls to specific contacts in electronic address books. Some autonomous automobiles are able to navigate and drive themselves to a destination encoded in the interpretation. Some automatic teller machines are able to authenticate users and give them cash. Some virtual shopping systems are able to search for products and display them to users. Some health monitoring systems are able to exchange questions and answers with patients and record symptoms. Some cognitive enhancement devices are able to stimulate brains with memories and skills.

The system of FIG. 1 includes a voice speaker identification module 15. It consumes the utterance, performs known methods of digital signal processing, compares the result to a database of voiceprints 16, and produces a UID, if it can identify a match. A UID permission check module 17 consumes the UID, compares it to a set of permissions in a permissions database 18, and produces an authorization indication. Action module 13 consumes the authorization indication, and uses it to determine whether or not to perform the action indicated by the interpretation resulting from the utterance. Some embodiments include multiple parallel action modules, and some embodiments perform different functions in the action module based on authorization. For example, a voice-enabled automatic teller machine (ATM), that receives an utterance without authorization, might refuse to allow a request for cash, but still transmit a recording of the audio to a bank-operated server.

Speaker identification is generally most accurate in systems and environments with a smaller number of users, such as homes and privately owned automobiles. Public systems such as taxis, shopping kiosks, and ATMs, which have large numbers of users, cannot easily distinguish from so many. Some such systems, such as ATMs, use voice speaker identification as a confirmation to other credentials, such as a card number and personal identification number.

Some embodiments bias characterization (classification or user identification) based on recent history. Some such embodiments do so by maintaining a history buffer in random access memory (RAM). Some embodiments maintain a history buffer in a file on a disk drive or other computer storage medium. The history buffer stores one or more characteristic values and a timestamp for each of a small number of utterances, such as 5. The characterization process reads the buffered characteristic values; discards ones with timestamps greater than a certain period of time, such as 5 minutes; and uses the remaining characteristic values for the biasing function. For example, a characterization process gives significantly greater weight to characteristic hypotheses matching characteristics, such as a UID or a class, realized for the previous utterance, and slightly greater weight to characteristic hypotheses matching characteristics realized for the previous five utterances or for the past five minutes. Different embodiments use different specific values of characteristic-based weights. For example, a significantly greater bias is one that causes a 2× difference in scores for hypotheses that would otherwise have a 1.01× difference in scores and a slight bias is one that causes a 1.02× difference in scores for hypotheses that would otherwise have a 1.01× difference in scores. This is useful because the most recent speaker is the most likely next speaker in most use cases. However, this risks frustration because, if an initial characterization is incorrect, then the speaker will tend to remain mischaracterized.

Figure 2:
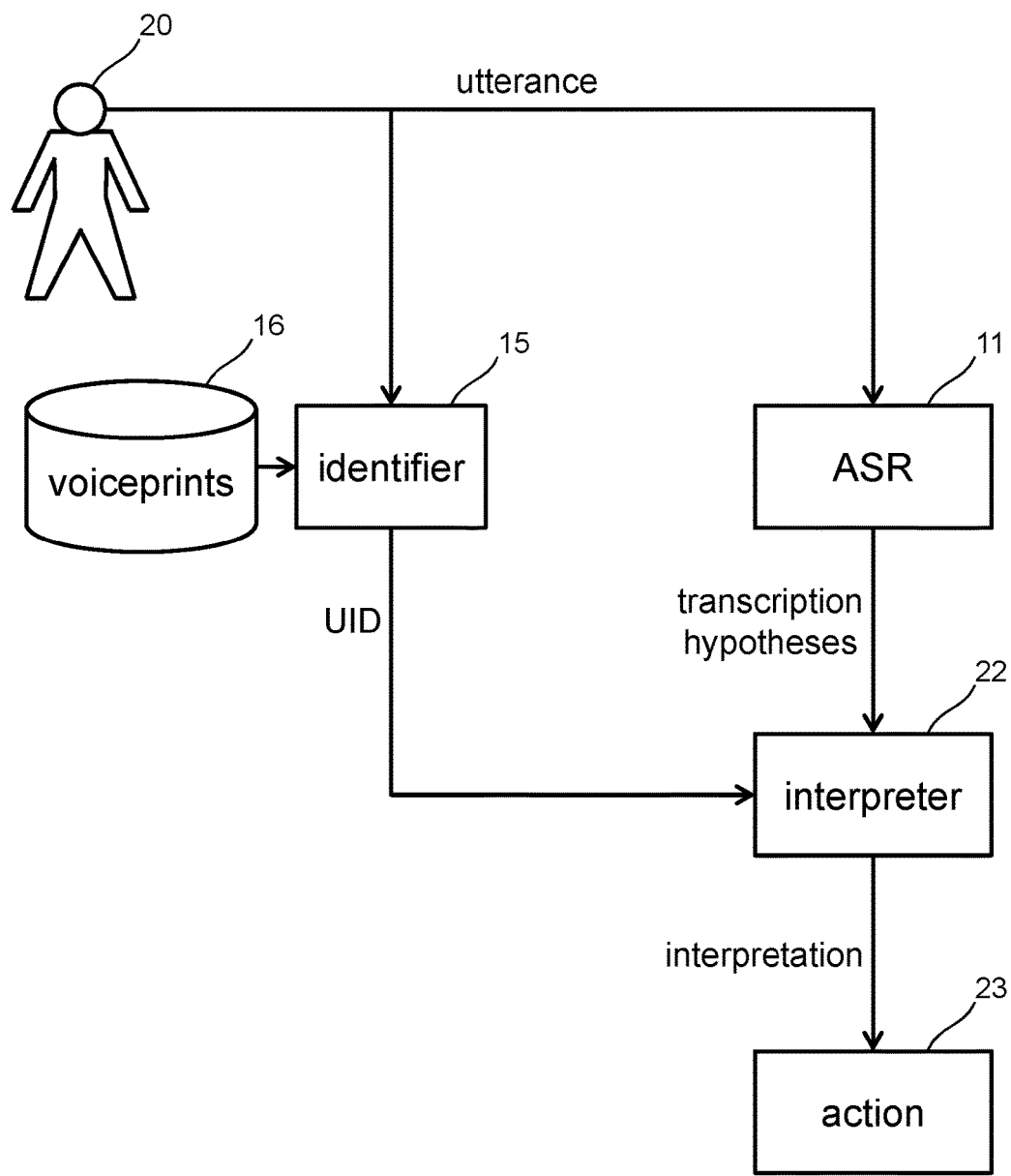
FIG. 2 illustrates operation of a speech-enabled device with voice speaker identification that conditions interpretation according to an embodiment of the invention.

FIG. 2 illustrates an embodiment that uses speaker identification to condition NLP interpretation according to a grammar. User 10 makes an utterance that ASR module 11 consumes to produce one or more transcription hypotheses, as described above. Interpreter 22 consumes the transcription hypotheses to produces an interpretation, which action module 23 consumes to perform requested actions, unconditionally. Voice speaker identification module 15 also consumes the utterance to produce a UID.

Interpreter module 22 consumes the UID and uses it to condition its interpretation according to a grammar. Some embodiments disallow interpretation of transcription hypotheses by certain domains of grammar rules, such as to restrict access to unlock a mobile phone to just its owner. Some embodiments maintain databases of UID-specific interpretation weights. Such an embodiment of an intelligent assistant recognizes that some users like sports and others care a lot about nature. Accordingly, an utterance about, "How are the bears doing" is interpreted for one user as a query about the standing of the sports team in its division and interpreted for another user as a query about the status of a recovering endangered species.

Figure 3:
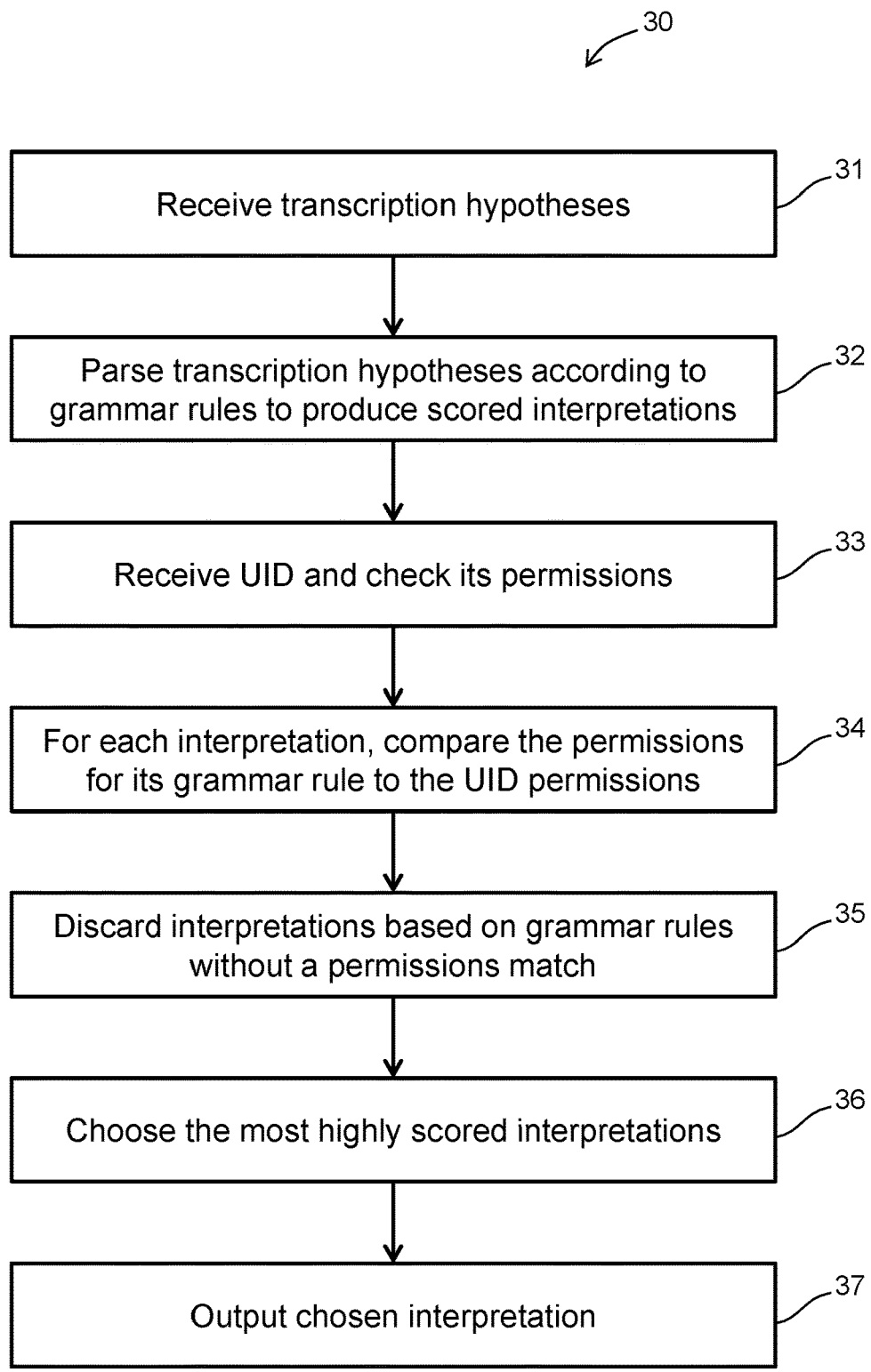
FIG. 3 illustrates a flow chart of interpretation of transcription hypotheses conditioned by UID in accordance with an embodiment of the invention.

FIG. 3 shows an example flow chart of a process 30 of interpretation of transcription hypotheses based on grammar rules where the grammar rules are conditioned by a UID. The process begins by receiving transcription hypotheses from an ASR module in step 31. The process proceeds in step 32 to parse each transcription hypothesis according to each grammar rule to produce an array of interpretations. Furthermore, the process computes a likelihood score for each interpretation and stores that, in a RAM, along with which grammar rule was used for each interpretation. In step 33 the process receives a UID associated with the utterance that produced the transcription hypotheses. The process looks up a set of permissions associated with the UID in a database of users and their assigned permissions. In step 34 the process proceeds to, for each interpretation in the array, check what grammar rule was used to produce the interpretation. The process looks up, for each grammar rule, a set of associated required permissions. In step 35 the process discards from the array each interpretation for which the required permission for its grammar rule are not met by the permissions assigned to the UID. In step 36 the process chooses the most highly scored of the remaining interpretations, and in step 37 outputs the chosen interpretation for an action module.

An example grammar rule according to the rule syntax of an embodiment is:

```
rule weather_request{
    action{weather_lookup(date);}
    includes {"weather" and ("what's" | ("what" & "is"));}
    date = extract_date( );
    if(date == NULL) date = today( );
    score{0.99}
    permissions{pWeather}
}
```

This grammar rule, named weather_request, invokes an action, which is to look up the weather forecast for a specified date variable through a web application programming interface (API). The grammar rule parses a given transcription, and checks whether it includes the word "weather" and either the word "what's" or both of the words "what" and "is". The rule calculates the date variable by extracting a date from the transcription, if possible. The function for extracting the date returns a null value if it fails to find a date in the transcription. The rule assigns today's date if the extracted date is null. The rule defines a constant score of 0.99, which indicates a very high confidence that the utterance transcription is a request for the weather forecast. Finally, the grammar rule is defined as only valid if the permission named pWeather is true.

Another example grammar rule is:

```
rule phone_call{
    action{dial(number);}
    includes {"call" and extract_person_id( );}
    number = number(contact(extract_person_id( )));
    score{if(extract_person_id( )!=NULL) 0.8 else 0}
    permissions{pDialer}
}
```

This grammar rule, named phone_call, invokes an action, which is to dial a phone number. The grammar rule parses a given transcription, and checks whether it includes the word "call" and one or more words that identify a specific person. The grammar rule looks up a phone number from a contact list for the extracted person identification. If the function to extract a person identification returns a NULL result, the score of the grammar rule is 0, otherwise it is 0.8. The grammar rule is defined as only valid if the permission named pDialer is true.

For a UID assigned the pWeather permission but not the pDialer permission, the interpreter will provide interpretations requesting weather lookups in response to utterances with such requests. However, the interpreter disregards grammar rules, and consequently does not output interpretations requesting phone calls for the voice-identified user. A grammar rule based approach provides specific permission-based controls to the many designers of grammar rules, whereas only the system designer can provide permission-based control over the action module.

Figure 4:
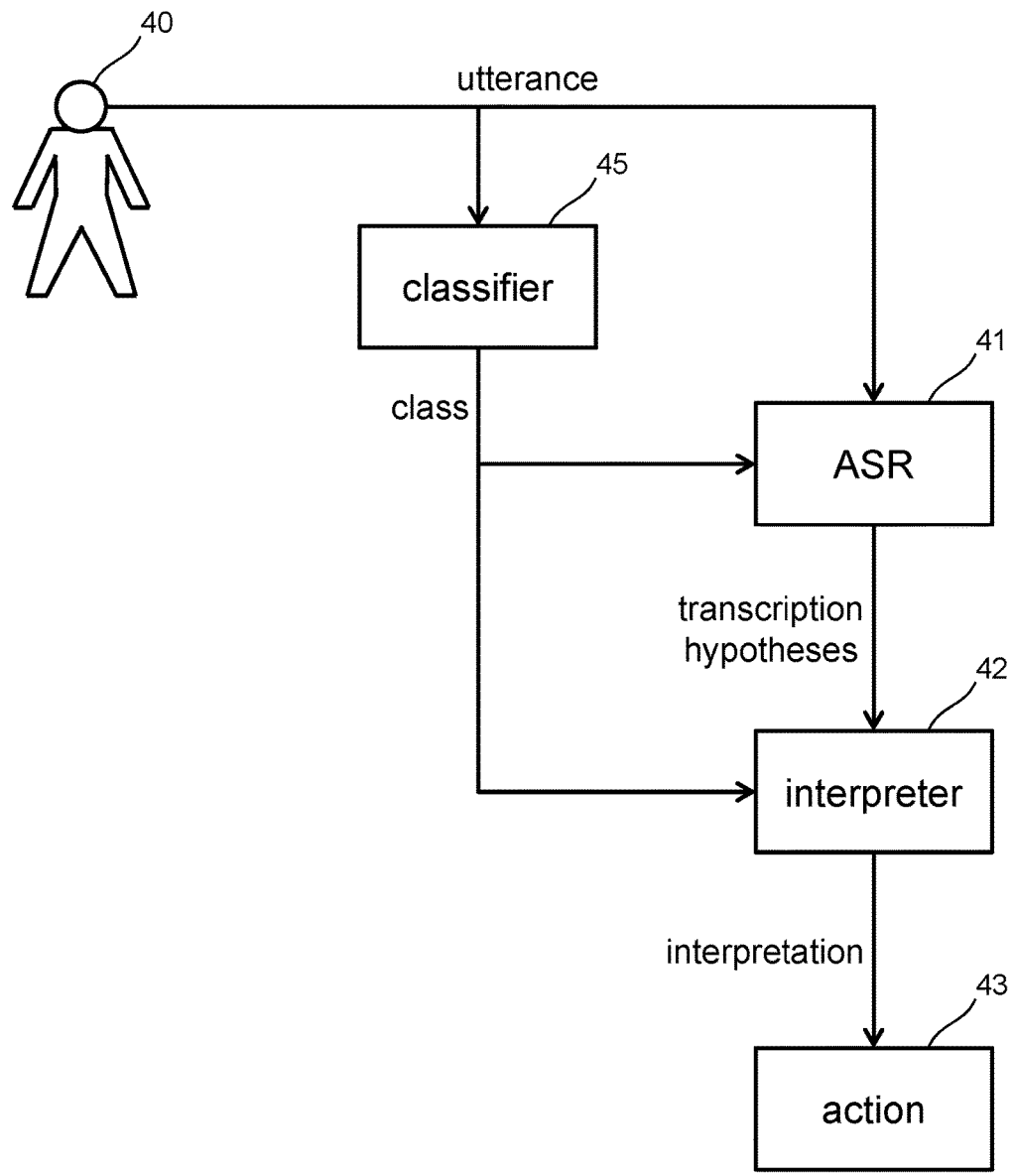
FIG. 4 illustrates operation of a speech-enabled device utterance classification that conditions ASR and interpretation according to an embodiment of the invention.

FIG. 4 illustrates an embodiment that uses utterance class to condition ASR and NLP interpretation according to a grammar. User 40 makes an utterance that ASR module 41 consumes to produce one or more transcription hypotheses, which interpreter 42 consumes to produces an interpretation, which action module 43 consumes to perform requested actions, unconditionally. Utterance classifier module 45 also consumes the utterance to produce classifications. In various embodiments the classification is a single Boolean value, a number within a range, or a data structure representing one or more Boolean values and numbers within ranges.

In some embodiments classification is by gender and the class output of classifier 45 is a Boolean value indicating a male or a female gender. In some embodiments the classification is by ethnicity, and the class output of classifier 45 is one value from a set of recognized ethnicities such as Afro-American, Chinese, British, Russian, and South Asian. In some embodiments the classification is an age, and the class output of classifier 45 is a value representing position along a continuum from young child to senior adult.

ASR module 41 consumes the classifications and uses them to condition its speech recognition processes. In some embodiments it changes the availability of words and phrases in the lexicon of its SLM. In some embodiments it changes the probability weights expressed within the SLM. In some embodiments, if the classifier 45 classifies the speaker as a child, ASR module 41 removes profane words from its lexicon and words related to pharmaceuticals. In some embodiments, if the classifier 45 classifies its speaker as having a Chinese accent, it will give slightly higher weight to words related to Chinese cooking and slightly lower weights to words related to Western religions.

Interpreter module 42 also consumes the classifications and uses them to condition its NLP process. The operation is similar to that of interpreter 22 in FIG. 2, except that interpreter 42 conditions interpretations according to classes, such as for the purpose of restricting access by children to certain content, and focusing advertising or search results to particular genders and ethnicities.

ASR

There are many ways to implement ASR. Many comprise a speech front end, such as the one 50 shown in FIG. 5. A phoneme recognizer 51 consumes utterance audio acoustic features, such as spectral features, of audio frames. Some embodiments represent sets of phoneme sequence hypotheses as lattices, which capture the commonalities among alternative sequences. The phoneme recognizer 51 uses a trained acoustic model 52. The phoneme recognizer 51 also uses phoneme sequence probabilities of a hidden Markov model (HMM) 53. For each frame of audio and its neighboring frames, the phoneme recognizer 51 produces a likelihood score for each hypothesized phoneme sequence. Other methods of producing phoneme sequence hypotheses are appropriate for various embodiments.

Some embodiments implement acoustic models using deep neural networks. They integrate observation probabilities from the acoustic model 52 and state transition probabilities from the HMMs 53 using a Viterbi optimization algorithm that determines the N best phoneme sequences, and their likelihood scores. Some embodiments implement acoustic models and HMMs together using recurrent neural networks. Some embodiments prune all but the phoneme sequence hypotheses with likelihood scores above a threshold, or such that a particular number of hypotheses remain available.

A speech engine 54 consumes the phoneme hypotheses and produces transcription hypotheses. It maps the set of hypothesized phoneme sequences to a set of hypothesized word sequences by matching in all possible pronunciations from the phonetic word vocabulary with contiguous subsequences of the phoneme sequences. This statistical analysis 55 computes the probabilities of word sequences from those of the phoneme sequences. Some embodiments do so by first using a phonetic dictionary to convert phonemes sequence hypotheses to word sequence hypotheses. This involves comparing the ordered sequence of phonemes in each hypothesis to the phonetic spelling of words in a phonetic dictionary. A phonetic dictionary is a list of words and their phonetic spellings. Note that a words like "cat" has three phonetic sounds, whereas a word like "the" has two. Speech engine 54 fits orders of phonemes to possible orders of words that would have the same sequence of phonemes. A SLM 56 weights word sequence hypotheses or phoneme sequence hypotheses, based on n-gram phrases and probabilities of their proximities. N-grams are sequences of words that tend to come together such as "son of a gun". SLMs model the probabilities of particular words or n-grams coming together. For example, the words "ice" and "cream" come together more often than the words "I" and "scream". Such probability models weight different hypotheses in order for the speech engine 54 to choose the most likely word sequence. The most likely word sequences form the transcription hypotheses output.

The SLM in use defines the lexicon of what spoken words and phrases the ASR system can recognize. Different specific users use different lexicons, specifically resulting from speakers' professions, cultures, age, breadth of education, and other vocabulary-affecting human conditions. Different speaker classes use different lexicons, generally resulting from the class's related professions, cultures, age, breadths of education, and other vocabulary-affecting human conditions. Some embodiments monitor the use of words and phrases by particular classes of speakers or individual users to tune SLMs for best results. For example, as new children's movies come out, children tend to use words related to the movie. The system changes SLM probabilities as the word usage of children's utterances evolve. Some embodiments give greater statistical weight to more recently recognized n-grams. For example, if a recent utterance was about screaming, then the word sequence "I scream" is more likely than the word sequence, "ice cream".

Figure 5:
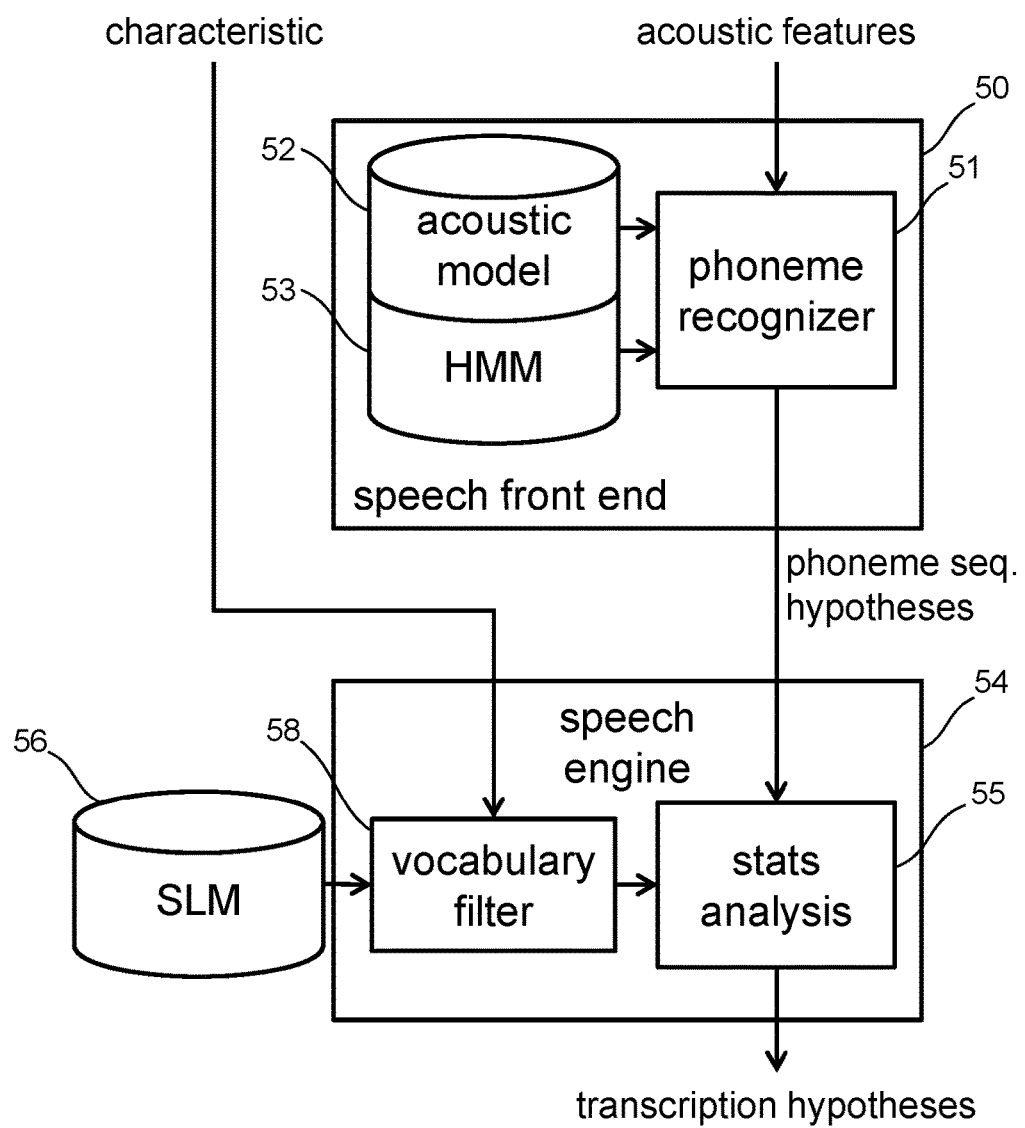
FIG. 5 illustrates an ASR system with a vocabulary filter conditioned by a speech characteristic according to an embodiment of the invention.

Various methods of customizing a SLM for uses by statistical analysis are possible and readily apparent to ordinarily skilled practitioners. FIG. 5 shows one example. A vocabulary filter 58 consumes the characteristics, such as a UID or a class, of each utterance and, accordingly, filters the set of n-grams considered by statistical analysis 55. Filter criteria are ones such as age, gender, accent, and specific UID. In some embodiments, the vocabulary filter 58 allows only certain sets of n-grams from the SLM that statistical analysis 55 can consider. In some embodiments, the vocabulary filter 58 adjusts the statistical weights encoded in the SLM according to the utterance characteristics, such as a UID or a class.

Figure 6:
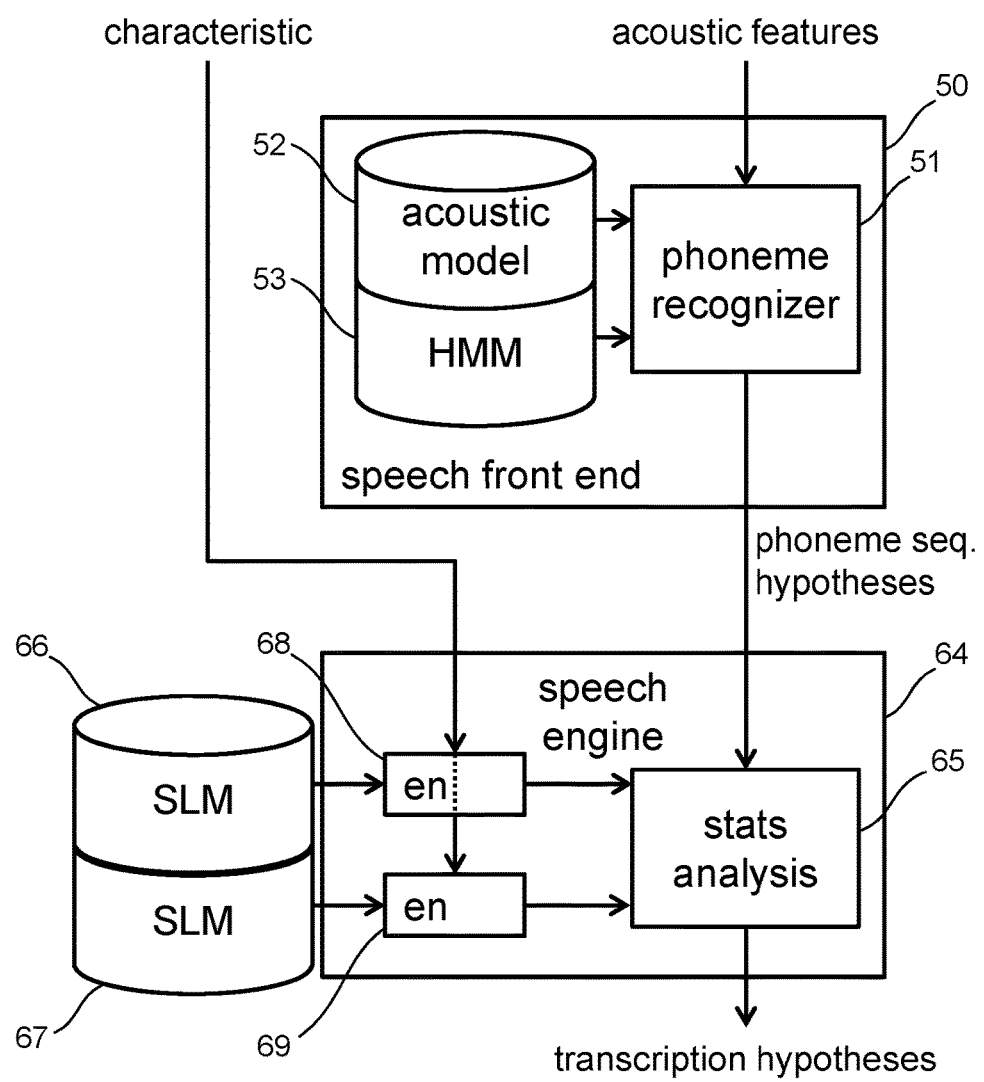
FIG. 6 illustrates an ASR system with SLMs enabled by a speech characteristic according to an embodiment of the invention.

FIG. 6 shows another example embodiment. It comprises multiple domain-specific SLMs. A phoneme recognizer 51, acoustic model 52, and HMM 53 operate as in the embodiment of FIG. 5. The embodiment of FIG. 6 includes a different design of a speech engine 64. It comprises statistical analysis 65, which incorporates analysis of a combination of a first SLM 66 and a second SLM 67. Various embodiments might, similarly, comprise more than two SLMs. In some embodiments, the statistical analysis 65 operates on each SLM independently, and chooses transcription hypotheses from the highest scoring hypotheses of each SLM. SLMs represent the probabilities of sequences of words as found in large corpuses of training data. Some embodiments merge the statistics of n-grams that are common to both SLMs, and perform calculations on the merged statistics. Various embodiments perform merging by linear interpretation of the probabilities in different SLMs, log-linear interpretations of the same, or unigram rescaling.

The embodiment of FIG. 6 comprises a first enablement 68 that conditionally enables the first SLM 66 for statistical analysis and a second enablement 69 that conditionally enables the second SLM 67 for statistical analysis. The enablements are both conditioned on the characteristics of the utterance. In various embodiments, enablements are conditioned by each other and by other environmental factors such as location, time of day, day of week, ambient noise, and various other factors that affect the likelihood of different SLM choices. Some embodiments perform SLM merging, per utterance, by look-up of the words in the phoneme sequence hypothesis. The enablement of different SLMs conditions the inclusion of their statistics in the merging calculation. This is useful, regardless of the particular choice of SLM merging algorithm.

Embodiments of the invention, by eliminating transcription hypotheses, or reducing the weight of unlikely transcription hypotheses, reduce the number of NLP parsing operations that computer processors need to perform to provide users with satisfactory accuracy. While the benefits are small on a per-utterance basis, at the scale of a cloud server farm, the resulting reduction in transcription hypotheses results in significantly lower power, higher throughput, better accuracy, or a combination of benefits.

Ordinarily skilled practitioners will recognize that the embodiments depicted in FIG. 5 and FIG. 6, and described herein, are exemplary and that various combinations of Boolean enablement and reweighting; various types and combinations of SLM filters; and various algorithms for statistical analysis, including ones described and others not specifically described are appropriate for various embodiments.

NLP

Figure 7:
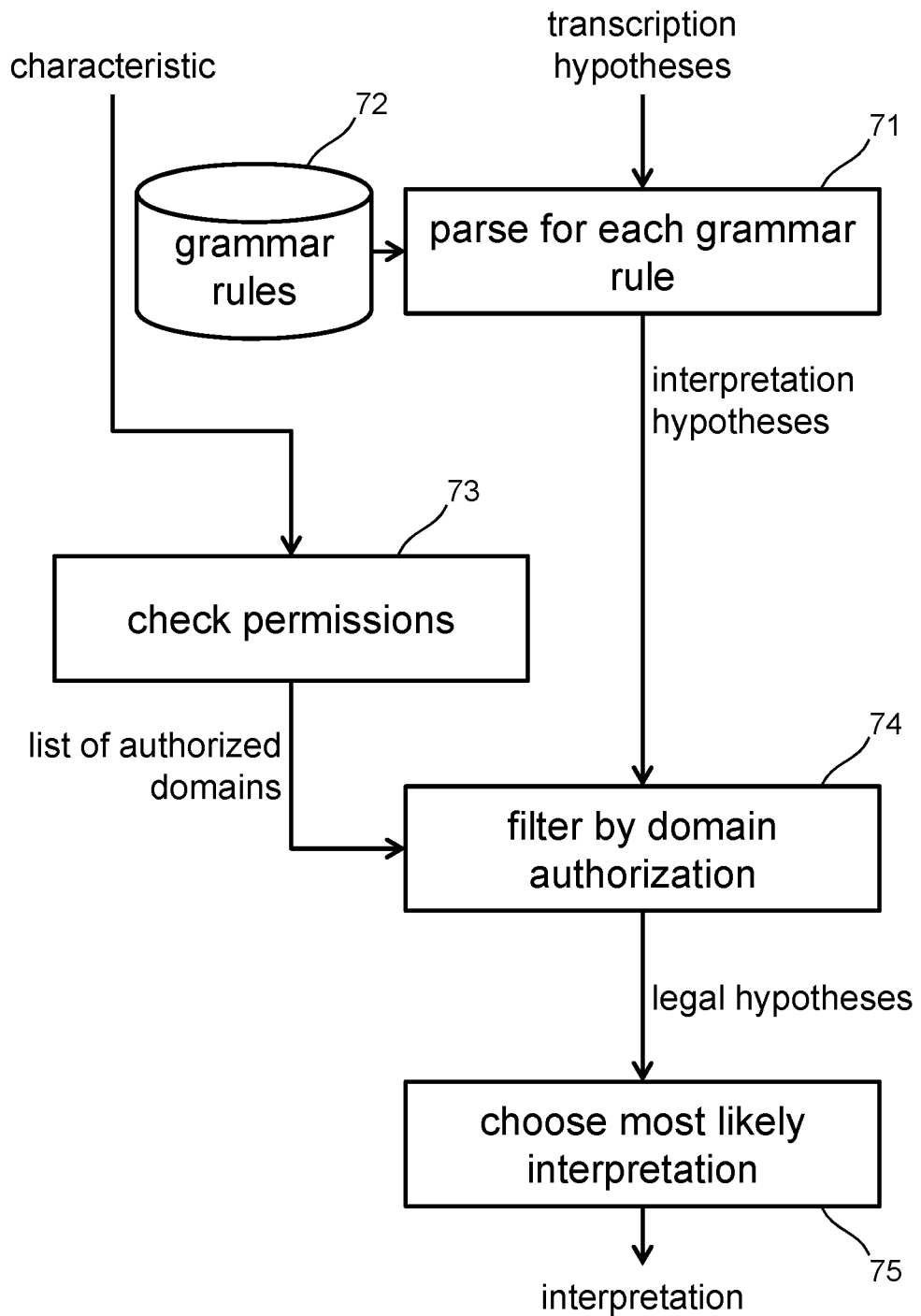
FIG. 7 illustrates a NLP system with domain enablement filtered according to a speech characteristic according to an embodiment of the invention.

There are many ways to implement NLP. Many comprise parsing one or more transcription hypotheses according to grammar rules. Many comprise parsing parts of speech of transcription expression constituents. FIG. 7 shows an embodiment. It begins with a grammar rule parser 71, which consumes sets of input transcription hypotheses and interprets each one according to each of a set of grammar rules 72 to produce a set of interpretation hypotheses, each with a likelihood score. Various schemas for specifying grammar rules are appropriate, such as VoiceXML and Speech Recognition Grammar Specification. Various proprietary grammar parsing systems exist.

The embodiment of FIG. 7 performs a permissions check 73, which consumes the utterance characteristics as input and produces a list of authorized domains. It does so by accessing a database of users and their assigned permissions. The database is maintained by a system administrator for the NL processing system, and updated as users add accounts and domain developers create permission types. A domain authorization filter 74 consumes interpretation hypotheses, compares their domains to the list of authorized domains, and discards hypotheses from grammar rules from unauthorized domains. In some embodiments, permissions check 73 provides a list of authorized actions, such as weather lookup and phone dialing within domains, and domain authorization filter 74 filters hypotheses by their requested action. This is useful, for example, to prevent children from performing expensive or destructive actions. The domain authorization filter 74 produces a set of legal interpretation hypotheses. A final stage 75 consumes the set of legal interpretation hypotheses, prunes the set to those with a likelihood score above a specific threshold, and chooses the one with the highest likelihood score for the NLP output if any remain after pruning.

In various embodiments, the permissions check 73 compares one or more of an utterance classification, speaker classification, and UID to a determined set of conversation domains that the user and system are authorized to discuss. In some embodiments, companies define proprietary domain sets of grammar rules that invoke accesses to APIs that offer proprietary information. Only users with authorized UIDs are allowed to discuss with the system proprietary topics and cause requests to the proprietary APIs. Accordingly, the permission check 73 excludes the proprietary domain from the list of authorized domains that it produces. The system interprets utterances from unauthorized users according to whatever default grammar rules it authorizes. If the utterance is general in nature, a non-proprietary interpretation hypothesis will yield the highest interpretation likelihood score and give a generic response. If the utterance is very specific to the proprietary information, no other grammar rules will yield a highly scored interpretation hypothesis, and the query will produce no useful response.

Some embodiments allow for grammar rules related to mature or offensive subject matter. For utterances classified as being from a child's voice, the mature or offensive domains will be unavailable for interpretations. As a result, if a child requests mature or offensive content, the utterance will find a most highly scored interpretation hypotheses from a generic grammar rule, or will find no significantly highly scored hypothesis and receive no useful response. This way, devices can satisfy some adults' wishes to engage in crude spoken interactions, while the device automatically remains child-safe.

Figure 8:
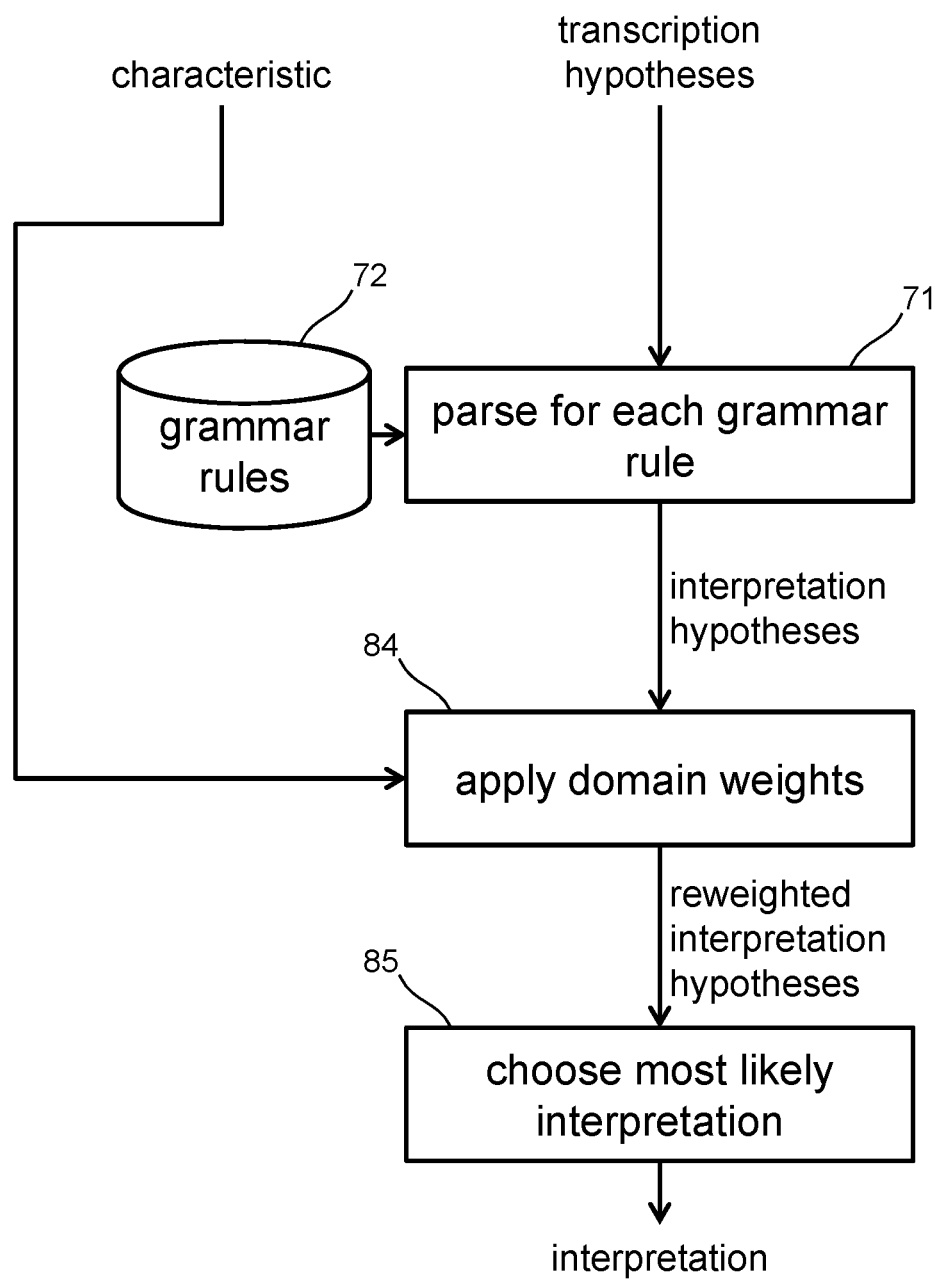
FIG. 8 illustrates a NLP system with domain weights conditioned by a speech characteristic according to an embodiment of the invention.

FIG. 8 shows an example of an embodiment that does not block domains, but adjusts the likelihood scores of interpretation hypotheses according to the characteristics of the utterance. It comprises parsing 71 according to grammar rules 72 to produce interpretation hypotheses, as in the embodiment of FIG. 7. A module 84 consumes interpretation hypotheses and characteristics of the utterance and applies weights, based on the characteristics, to the interpretation hypotheses to produce a set of reweighted interpretation hypotheses. Reweighting is a process of scaling the scores that grammar rules compute. A final stage 85 consumes the set of reweighted interpretation hypotheses, prunes the set to those with a likelihood score above a specific threshold, and chooses the one with the highest likelihood score for the NLP output if any remain after pruning.

Some embodiments use an age group characteristic to give relatively higher weight to toy domains in response to a characteristic indicating that the speaker is a child. Some embodiments apply weights at finer granularity than domains. For example, some embodiments, in response to an indication that the speaker is a child, give increased weight to interpretation hypotheses based on the homonym "engineer" from grammar rules relating to trains, whereas the word would have relatively higher weight for domains about technical professions for adult class speakers. For a query, "show me a picture of an engineer" a child would get a drawing of a person in a train engine and an adult would get a picture of a person with a pocket protector and glasses sitting at a desk.

Some embodiments use a gender classification to give higher weight for interpretations based on the homonym "pumps" to shoe grammar rules for women and fluid-moving machinery for men. For a query, "where's the nearest store that sells pumps" a woman would get a response showing shoe stores and a man would get a response showing athletic equipment stores. Some embodiments use a regional accent classification to give higher weight for interpretations based on the homonym "boot" to automotive grammar rules for British speakers and shoes for American speakers. For a query, "how to get dirt out of a boot" a British-accented user would get instructions for Hoovering a car in a garage and an American-accented speaker would get instructions for rubbing with a gentle cloth. Some embodiments use prosody classification to give higher weight for interpretations that have a rising intonation at the end of the expression to grammar rules that expect yes/no questions.

Some embodiments apply weights to interpretations based on various criteria. For example, to respond about the weather in "Paris", some virtual assistants detect the proximity of the user to each of Paris, Tex. and Paris, France to interpret which one. Such virtual assistants also consider the relative popularity of queries about each city to weight the choice of interpretation. Some embodiments also use an accent classification to further weight the choice. Detecting a French accent increases the score for the interpretation about Paris, France. Detecting a Texas accent increases the score for interpretations about Paris, Tex.

Figure 9:
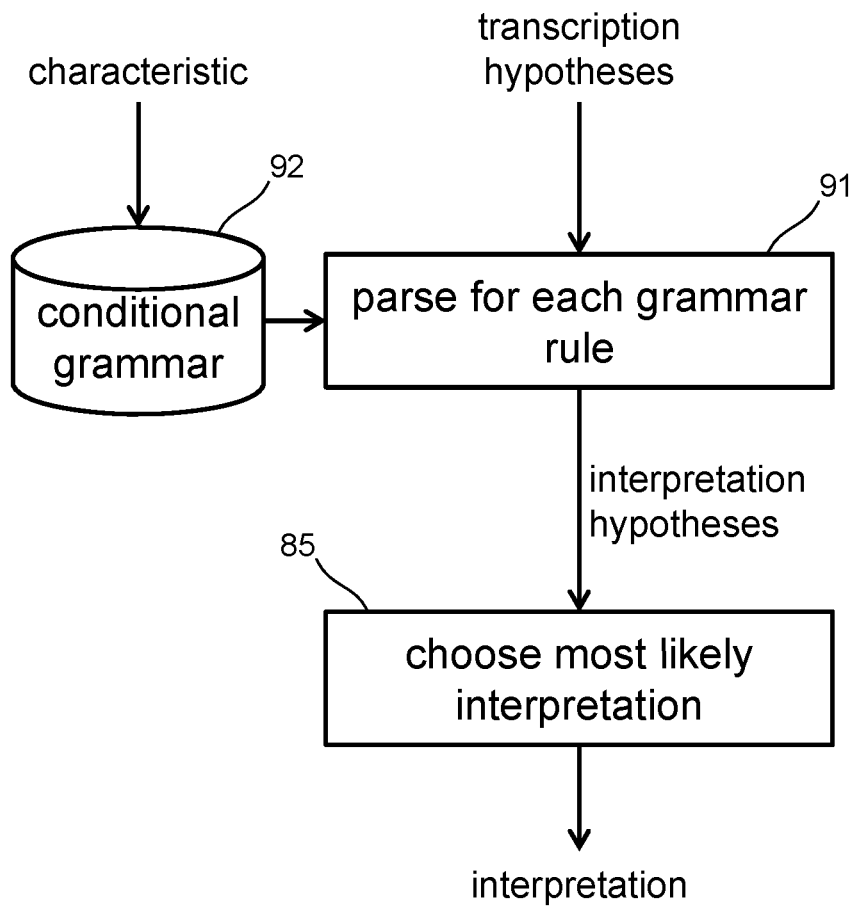
FIG. 9 illustrates a NLP system with a grammar that is conditional based on a speech characteristic according to an embodiment of the invention.

The embodiments of FIG. 7 and FIG. 8 use unconditional grammar rules, and apply conditioning to completed interpretations. FIG. 9 shows an embodiment with a conditional grammar. Conditional grammar rules are written in a conditional grammar definition language and comprise statements that are effective to control grammar interpreters to interpret transcription hypotheses conditionally when a system identifies a specific characteristic of a speech utterance to be true. One type of conditional statement is an if statement. Another type is a while statement. One example if statement is, "if(age!=child)" where "age!=child" is the condition indicating that the age characteristic is not a child. The grammar interpreter only interprets the statement following the conditional statement if the system identifies the condition as being true.

A conditional grammar offers greater configurability, but requires relatively more complexity to program conditions. Grammar rules may include conditions based on the values of characteristics. Various languages for defining grammars support defining conditions based on semantic information in a hypothesized utterance. One such rule would be to resolve pronoun references, conditioned on whether the pronoun is a male or female one. However, the embodiment of FIG. 9 further allows the conditioning of grammar rules based on utterance characteristics. The embodiment comprises parsing 91 according to conditional grammar rules 92 to produce interpretation hypotheses. A final stage 85 consumes the set of interpretation hypotheses, prunes the set to those with a likelihood score above a specific threshold, and chooses the one with the highest likelihood score for the NLP output in any remain after pruning.

An example conditional grammar rule according to the rule syntax of an embodiment is:

```
rule adult_call{
    action{dial(number);}
    includes {"call" and extract_person_id( );}
    number = number(contact(extract_person_id( )));
    score{if(extract_person_id( )!=NULL) 0.8 else 0}
    condition{voice_age_estimate>12}
}
```

This grammar rule, named adult_call, invokes an action, which is to dial a phone number. The grammar rule parses a given transcription, and checks whether it includes the word "call" and one or more words that identify a specific person. The grammar rule looks up a phone number from a contact list for the extracted person identification. If the function to extract a person identification returns a NULL result, the score of the grammar rule is 0, otherwise it is 0.8. The grammar rule is defined as only valid if the voice classification estimates that the age is greater than 12.

The embodiments of FIG. 7 and FIG. 8 condition interpretation hypotheses based on their domain. Since domains represent sets, often large, of grammar rules they operate at a coarse granularity. Conditional grammar rules give grammar developers the option for fine-grained subtlety based on characteristics of an utterance. For example, an utterance about "football" spoken with a British accent is, with a high likelihood score, in the domain of sports. However, a conditional grammar rule can, define a higher weight to soccer if the utterance is spoken with a British English accent than if it is spoken with an American English accent since soccer is called football in Britain.

To block individual rules, a grammar developer may set conditional grammar rule weights to zero. Grammar developers may also condition rules based on particular UIDs. Some systems require a user to recite a phrase, such as one that uses all English phonemes and is long enough to gather statistics, in order to match against a voiceprint. Upon detecting a match, the system enables the UID for all utterances with a voice match within a reasonable distance of the voiceprint. Various embodiments use different algorithms for voice matching. In some embodiments, distance is calculated as the absolute difference in peaks of formant frequency bands for corresponding strongly hypothesized diphones. This requires utterances with corresponding diphones. Some embodiments match based on individual phonemes, of which there is more probable correspondence matches between different utterances. If a specified period of time passes without receiving an utterance sufficiently close to the voiceprint, then the system disables the UID until the user recites the key phrase again. One phrase that uses all English phonemes is, "That quick beige fox jumped in the air over each thin dog. Look out, I shout, for he's foiled you again, creating chaos." Another such phrase is, "With tenure, Suzie'd have all the more leisure for yachting, but her publications are no good."

Embodiments of the invention, by eliminating interpretation hypotheses, eliminating grammar rules, or reducing the weight of unlikely interpretation hypotheses, reduces the amount of processing required for NLP parsing with satisfactory accuracy. While the benefits are small on a per-utterance basis, at the scale of a cloud server farm, the resulting reduction in interpretation hypotheses results in significantly lower power, higher throughput, better accuracy, or a combination of benefits.

Ordinarily skilled practitioners will recognize that the embodiments depicted in FIGS. 7-9, and described herein, are exemplary and that various combinations of Boolean enablement and reweighting; various combinations of conditional grammars and conditional pruning of interpretations; and various combinations of characteristics, including ones described and others not specifically described are appropriate for various embodiments.

System Partitioning

Ordinarily skilled practitioners will also recognize that the embodiments depicted in FIGS. 1-3, and described herein, are exemplary and that various method steps and system components, including ones described and others not specifically described are appropriate for various embodiments, and that not all are necessary for all embodiments. Furthermore, any number or combination of method steps and system components may be implemented by and within: servers or clients; software or hardware; mobile or stationary devices; large or portable devices; always-on or occasionally powered devices; display-enabled or non-visual devices; and touch-enabled or voice-only devices.

Figure 10:
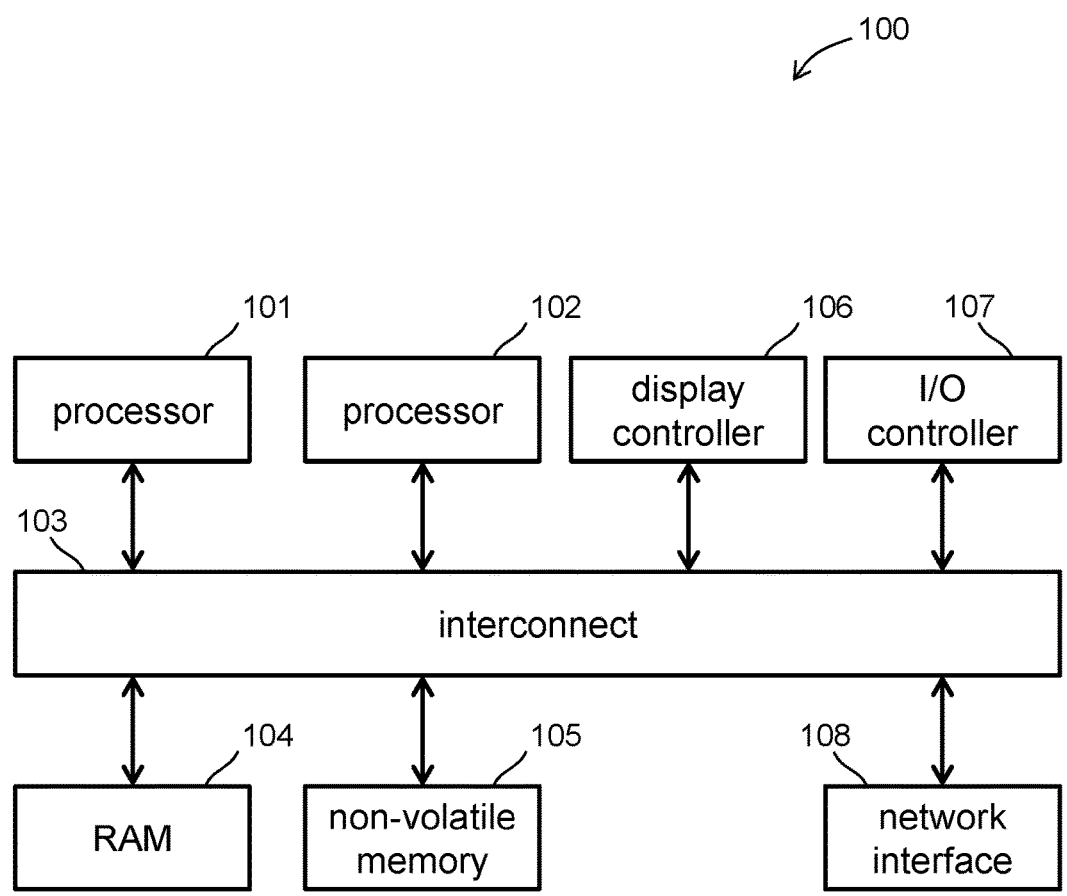
FIG. 10 illustrates a computer processing system according to an embodiment of the invention.

FIG. 10 shows a software-implemented embodiment that runs on computer processors. Computer system 100 comprises parallel processors 101 and 102, which connect to interconnect 103, through which the processors can execute software from instructions and operate on data stored in random access memory (RAM) 104 and non-transitory, non-volatile memory 105. Software running on computer system 100 accesses the Internet through network interface 108, provides a GUI through display controller 106, and accepts user input through I/O controller 107, all of which are also connected through interconnect 103.

In some embodiments, the processors are ARM instruction set processors. In some embodiments they are x86 processors. In some embodiments, memories, controllers, and interfaces are all on the same system-on-chip. In some embodiments, some elements are in different chips. In some embodiments, the non-volatile memory is a hard disk drive. In some embodiments, it is a solid-state drive. In some embodiments, the display controller connects to a local device display panel through a mobile industry processor interface (MIPI) display serial interface (DSI). In some embodiments, the display controller connects to a HDMI connector. In various embodiments, the I/O controller interfaces to touch screens, keyboards, mice, microphones, speakers, and USB connectors. In various embodiments, the network interface is an Ethernet cable interface, WiFi interface, Bluetooth interface, and 5G LTE interface. Though examples cited in this application are use the English language, ordinarily skilled practitioners will recognize that the methods and machines disclosed and claimed herein can be practiced on almost any human language, including Chinese, Japanese, Korean, German, Spanish, French, Hindi, Italian, Russian, Dutch, Arabic, Turkish, Swedish, Polish, Hebrew, and Tuvaluan, among others.

What is claimed is:

1. A non-transitory computer-readable medium comprising code effective to cause one or more processors to:
    characterize a speech utterance to determine at least one characteristic;
    recognize the speech utterance, without regard to the at least one characteristic, to produce at least one transcription hypothesis;
    parse the at least one transcription hypothesis according to a set of grammar rules to produce a plurality of interpretation hypotheses, each having a corresponding likelihood score;
    provide a plurality of grammar rule weights for the plurality of grammar rules corresponding to a plurality of speech characteristics;
    select one or more grammar rule weights corresponding to the at least one characteristic from the plurality of grammar rule weights;
    for each interpretation hypothesis of the plurality of interpretation hypotheses, adjust the likelihood score of the each interpretation hypothesis according to the selected one or more grammar rule weights corresponding to the at least one characteristic;
    determine a set of authorized domains based on the at least one characteristic; and
    filter the plurality of interpretation hypotheses according to the set of authorized domains; and
    select a selected interpretation hypothesis from the plurality of interpretation hypotheses according to the likelihood scores thereof.

2. The non-transitory computer-readable medium of claim 1 wherein the at least one characteristic is mood.

3. The non-transitory computer-readable medium of claim 1 wherein the at least one characteristic is prosody.

4. The non-transitory computer-readable medium of claim 1 wherein the at least one characteristic is a rising intonation at the end of the speech utterance that indicates a yes or no question.

* * * * *